US008960446B2

(12) United States Patent
Young et al.

(10) Patent No.: US 8,960,446 B2
(45) Date of Patent: Feb. 24, 2015

(54) SHAKER SEAL

(76) Inventors: Grant Young, Tulsa, OK (US); Ray Young, Glenpool, OK (US)

( * ) Notice: Subject to any disclaimer, the term of this patent is extended or adjusted under 35 U.S.C. 154(b) by 357 days.

(21) Appl. No.: 12/925,724

(22) Filed: Oct. 28, 2010

(65) Prior Publication Data
US 2012/0103877 A1    May 3, 2012

(51) Int. Cl.
*B07B 1/46* (2006.01)
*F16J 15/10* (2006.01)

(52) U.S. Cl.
CPC . *F16J 15/106* (2013.01); *B07B 1/46* (2013.01)
USPC ............ 209/405; 209/408; 209/412; 277/644

(58) Field of Classification Search
USPC .................. 209/405, 408, 412; 277/642–644
See application file for complete search history.

(56) References Cited

U.S. PATENT DOCUMENTS

| | | | | |
|---|---|---|---|---|
| 2,700,196 A * | 1/1955 | Panhard | .................... | 52/204.597 |
| 3,165,793 A * | 1/1965 | Lynch | ........................... | 49/479.1 |
| 6,089,380 A * | 7/2000 | Hazrati et al. | ................ | 210/411 |
| 6,283,303 B1 * | 9/2001 | Lane et al. | ..................... | 209/405 |
| 7,150,358 B2 * | 12/2006 | Carr et al. | ...................... | 209/403 |
| 7,168,569 B2 * | 1/2007 | Peresan | ......................... | 209/246 |
| 2007/0187304 A1 * | 8/2007 | Zhao et al. | ..................... | 209/408 |
| 2009/0256317 A1 * | 10/2009 | Mellander | ..................... | 277/642 |
| 2011/0198269 A1 * | 8/2011 | Young et al. | ................ | 209/365.1 |

* cited by examiner

Primary Examiner — Joseph C Rodriguez

(57) ABSTRACT

A seal can have a middle portion, an upper lip, and a lower lip. The upper lip has a configuration with an upper end portion, an upper top portion, and an upper bottom portion with a void space defined in part by the upper end portion, the upper top portion, and the upper bottom portion. The lower lip can have a configuration with a lower end portion, a lower top portion, and a lower bottom portion with a void space defined in part by the lower end portion, the lower top portion, and the lower bottom portion. A middle portion connects the upper lip and the lower lip.

7 Claims, 11 Drawing Sheets

SHAKER SEAL

CROSS-REFERENCE TO RELATED APPLICATIONS

Not Applicable

STATEMENT REGARDING FEDERALLY SPONSORED RESEARCH

Not Applicable

FIELD OF THE INVENTION

This invention relates to a seal used in shakers for separating materials.

BACKGROUND OF THE INVENTION

Shakers or vibratory screen devices can be used to separate materials. Solids can be separated from a primarily aqueous fluid or from a primarily oily fluid. Some shakers have multiple screens with a screen/mesh for separating the solids from the fluid. Typically, the fluid passes through the screen/mesh and the solids remain atop the screen/mesh. The screens can have a stepped arrangement where solids fall from the discharge end of each screen to the feed end of the next screen. The shaker can have a framework in which each screen is placed. There is often a small gap between the framework and the leading edge of the screen. Solids can fall down into this gap and then pass into the separated fluid. Seals within this gap have been used to improve this problem but are often removed with difficulty when damaged or when being replaced. There is a need for a seal that can be removed easily while at the same time creating a tight seal between the framework of the shaker and the screen.

The instant invention as disclosed within this application, provides a seal that fills this need. The art referred to and/or described within this application is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All US patents and applications and all other published documents mentioned anywhere in this application are incorporated herein by reference in their entirety. The seals of this patent application can be used on any shaker Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

Among other things, this application presents a concept of a seal covering at least a portion of a crossframe member in an effective and efficient manner which can be applied to many shakers and applications. Patent application Ser. No. 12/658,686 to Young is incorporated by reference.

In at least one embodiment of the invention, a shaker can have a crossframe seal disposed about crossframes within the shaker. The crossframe seal can have a middle portion, an upper lip and a lower lip wherein the upper lip has a configuration with an upper end portion, an upper top portion, and an upper bottom portion with a void space defined in part by the upper end portion, the upper top portion, and the upper bottom portion. The lower lip can have a configuration with a lower end portion, a lower top portion, and a lower bottom portion with a void space defined in part by the lower end portion, the lower top portion, and the lower bottom portion. The middle portion connects the upper lip and the lower lip.

In at least one embodiment of the invention, the upper top portion and the lower top portion can be substantially parallel with one another.

In at least one embodiment of the invention, the middle portion can be substantially perpendicular to the upper to portion.

In at least one embodiment of the invention, the upper top portion can be substantially parallel to the upper bottom portion.

In at least one embodiment of the invention, the upper top portion can be longer than the upper bottom portion.

In at least one embodiment of the invention, the upper bottom portion and the lower bottom portion can be substantially parallel with one another.

In at least one embodiment of the invention, the upper top portion can be longer than the lower top portion.

In at least one embodiment of the invention, the upper end portion can be substantially perpendicular to the upper top portion and the upper bottom portion.

In at least one embodiment of the invention, the shaker can have crossframes between screens where the seal covers at least one of the crossframes and provides a seat for at least one of the screens. The crossframe is a member or support structure which extends between the side walls of the basket and is used to support the shaker screen.

In at least one embodiment of the invention, the shaker has a discharge seal disposed about the crossframe of the discharge end. The discharge seal can have an upper top portion and an upper bottom portion wherein the upper top portion is longer that the upper bottom portion.

In at least one embodiment of the invention, the shaker can have a cross feed seal disposed about the crossframe of the feed end. The cross feed seal can have a lower top portion and a lower bottom portion wherein the lower top portion is longer than the lower bottom portion.

In at least one embodiment of the invention, the cross feed seal can have a step lip extending upward from the crossframe of the feed end.

In at least one embodiment of the invention, the crossframe of the feed end has at least one hole that can fittingly engage to at least one nub on the cross feed seal.

In at least one embodiment of the invention, the seal can be secured to a crossframe by fittingly engaging to the crossframe.

In at least one embodiment of the invention, the seal can be of single piece construction and/or constructed of a polymer material.

In at least one embodiment of the invention, a shaker can have a crossframe seal disposed about crossframes within the shaker. The crossframe seal can have a middle portion, an upper lip and a lower lip wherein the upper lip has a configuration with an upper end portion, an upper top portion, and an upper bottom portion with a void space defined in part by the upper end portion, the upper top portion, and the upper bottom portion. The lower lip can have a configuration with an upper end portion, a lower top portion, and an upper bottom portion with a void space defined in part by the lower end portion, the lower top portion, and the lower bottom portion. The middle portion connects the upper lip and the lower lip.

In at least one embodiment of the invention, a discharge seal can lockingly engaging about the framework of the discharge end. Lockingly engaging refers to an engagement in which the seal does not just slide off, but rather requires a locking mechanism to be disengaged before removal of the seal.

In at least one embodiment of the invention, a feed cross seal can lockingly engage about the cross frame of the feed end.

In at least one embodiment of the invention, the cross frame of the feed end can have frame holes that match nubs extending from the feed cross seal wherein the nubs fittingly engage the frame holes.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE SEVERAL VIEWS OF THE DRAWING(S)

A detailed description of the invention is hereafter described with specific reference being made to the drawing.

FIG. 9b is a bottom view of the inventive seal of FIG. 9a.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated. In some embodiments, the basket can be defined by the sides of the vibrating screen device disposed under one or a plurality of screens. The stepped down configuration can include different levels of screens wherein there is an uppermost level and a lowermost level. These steps can proceed in a straight line or in other configurations (e.g. spiraling down steps).

Figure 1:
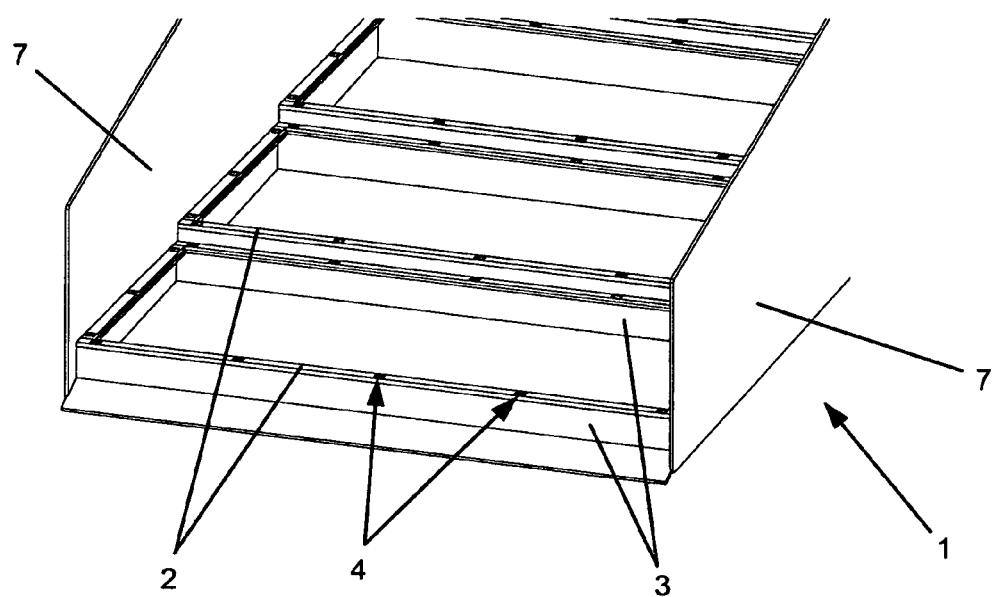
FIG. 1 is a perspective view of a shaker having riveted seals on the crossframes.

In FIG. 1 a shaker 1 with walls 7 and having riveted seals 2 is shown. The seals 2 are held to the cross-frame member 3 with rivets 4. Screws and other fastening devices are also used. When replacing the seals 2 the rivets may have to be unfastened or the screws unscrewed. This can be difficult and/or time consuming. Furthermore, the seal 2 can pucker along the cross-frame as the rivets or screws can create uneven attachment of the seal to the cross-frame. The riveted seals also allow contact between the material to be separated and the cross-frame in that material can get into the hole containing the rivet and around the edges of the seal 2. This can reduce the life of the cross-frame members.

Figure 2:
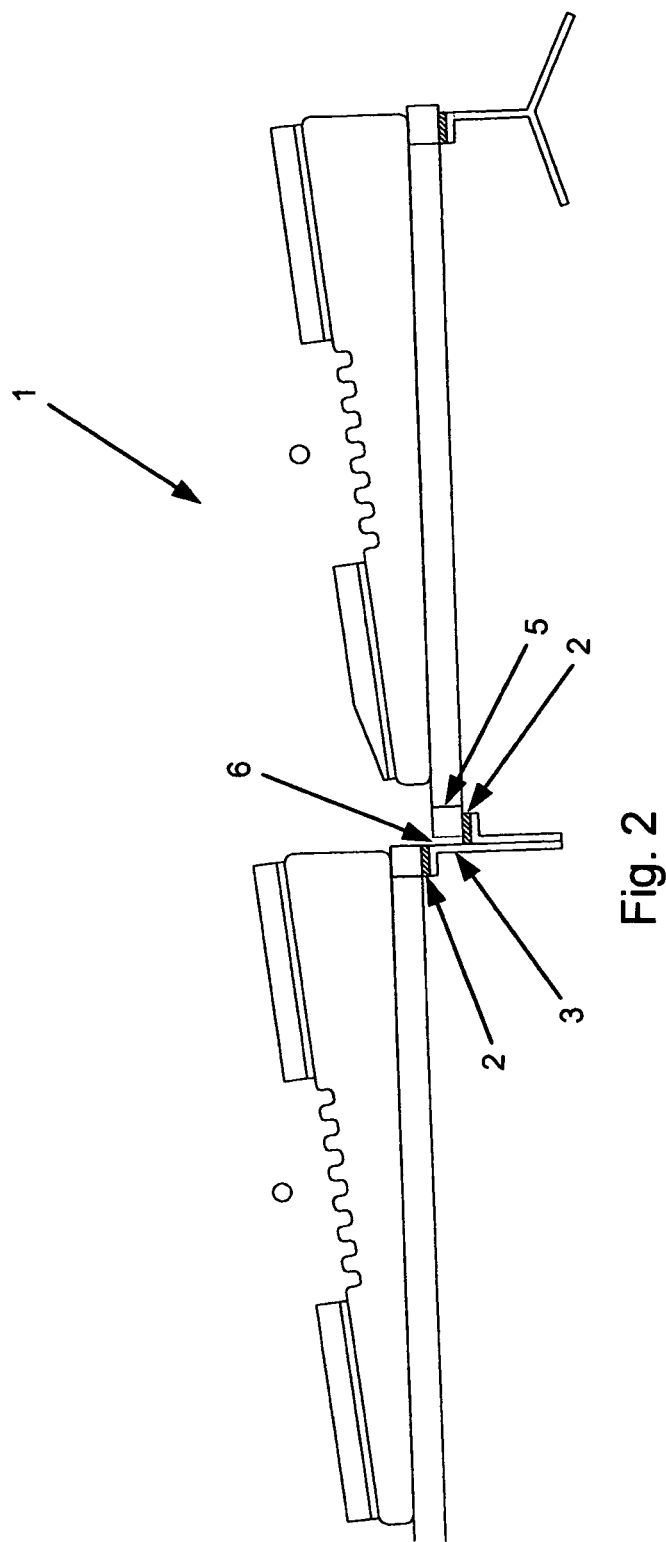
FIG. 2 is a side view of a shaker and screen with riveted seals.

In FIG. 2 a side view of a shaker 1 and screen 5 with riveted seals 2 is shown. As shown, there is a gap 6 between the cross frame member 3 which can result in solid material being trapped therein and potentially damaging the cross frame member 3.

Figure 3A:
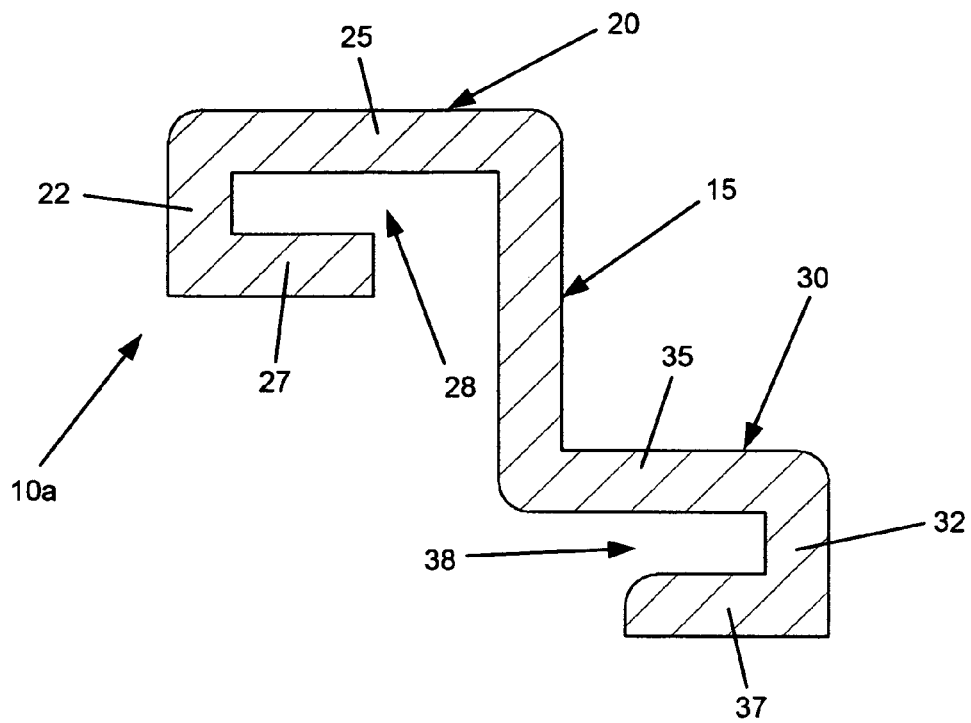
FIG. 3a is a cross-sectional view of an inventive cross-frame seal.
Figure 3B:
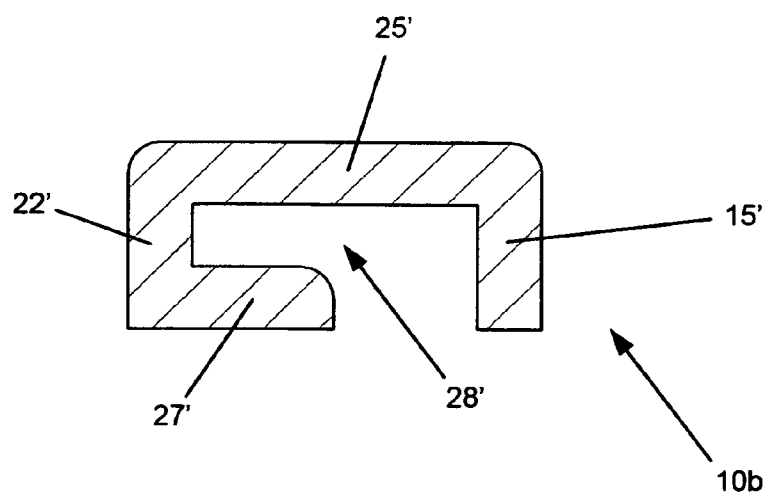
FIG. 3b is a cross-sectional view of an inventive discharge seal.

In FIGS. 3a and 3b cross frame seals 10a and 10b that wrap around the cross frame members are shown.

As shown in FIG. 3a, the seal 10a has a middle portion 15 connecting an upper lip 20 to a lower lip 30. The upper lip 20 as shown has a configuration with an upper end portion 22, an upper top portion 25, and an upper bottom portion 27 with a void space 28 defined in part by the upper end portion, the upper top portion, and the upper bottom portion. The lower lip as shown has a configuration with an lower end portion 32, a lower top portion 35, and a lower bottom portion 37 with a void space 38 defined in part by the lower end portion, the lower top portion, and the lower bottom portion.

The cross frame seals disclosed in this application can comprise a flexible material that returns approximately to its shape before having been fitted onto the cross-frame member. In some embodiments the material can be removed and replaced many times and return approximately to its original shape. In some embodiments a polymer is used. In some embodiments a rubber is used. In some embodiments polyurethane is used. In some embodiments a shape memory polymer can be used. In some embodiments thermoplastic and/or thermoset polymeric materials are used as the seal material.

As shown in FIG. 3a, the upper top portion 25, the lower top portion 27, the upper bottom portion 35, and the lower bottom portion 37 are substantially parallel with one another and substantially perpendicular to the middle portion 15, the upper end portion 22, and the lower end portion 32. In some embodiments, one or more of the substantially parallel portions shown are not substantially parallel and/or one or more of the perpendicular portions shown are not substantially perpendicular.

Figure 4:
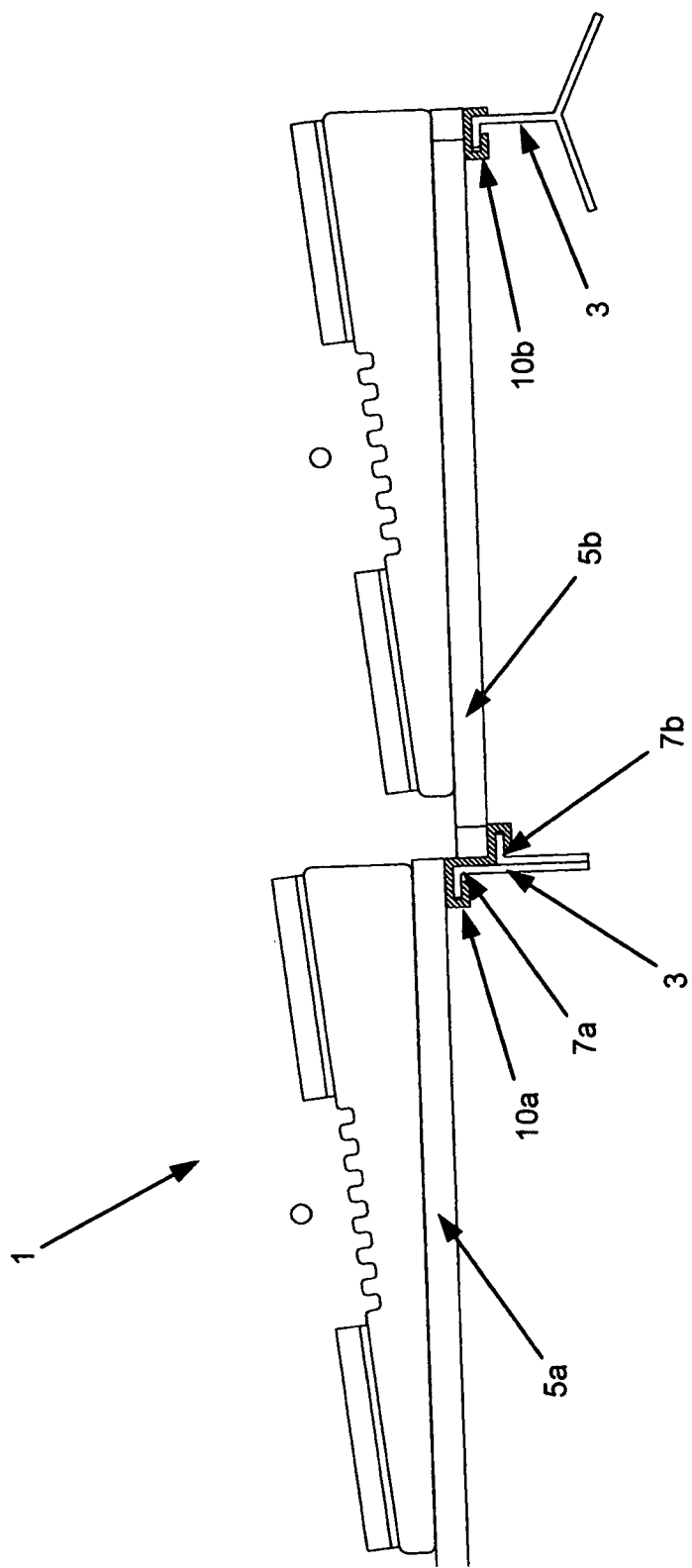
FIG. 4 is a side view of a shaker and screen with cross-frame seal and discharge seal.

In FIG. 4, a cross-sectional side view of a vibrating screen device 1 having screens 5a and 5b, cross frame members 3, and cross frame seals 10a and 10b is shown. As shown, the middle cross frame seal 10a fully covers the middle cross frame member 3 that would contact a screen. The middle cross frame member 3 has seat portions 7a,7b for both the upstream screen 5a and the downstream screen 5b. The middle cross frame seal 10a also covers the gap 6 shown in FIG. 2. By doing so, corrosive effects that can be present with material needing to be separated can be greatly reduced. This can extend the life of the vibrating screen device and/or cross frames. As shown the seal 10a is held in place, in large part, by the form of the seal itself, but also by having the screens 5a, 5b disposed on the seal.

Also shown in FIG. 4 is a discharge cross-frame seal 10b. This seal can have a similar shape as that of the upper top portion 25, the lower top portion 27, the upper end portion 22, and at least a portion of the middle portion 15 of middle cross frame seal 10a. Greater detail of a discharge seal 10b is shown in FIG. 3b having an end portion 22', a down portion 15', a upper portion 25', and a lower portion 27' with a void space 28' defined at least in part by the end portion, the down portion, the upper portion, and the lower portion.

As shown in FIG. 3b, the upper portion 25' and the lower portion 27' are substantially parallel with one another and substantially perpendicular to the down portion 15' and the end portion 22'. In some embodiments, one or more of the substantially parallel portions shown are not substantially parallel and/or one or more of the perpendicular portions shown are not substantially perpendicular.

Figure 3C:
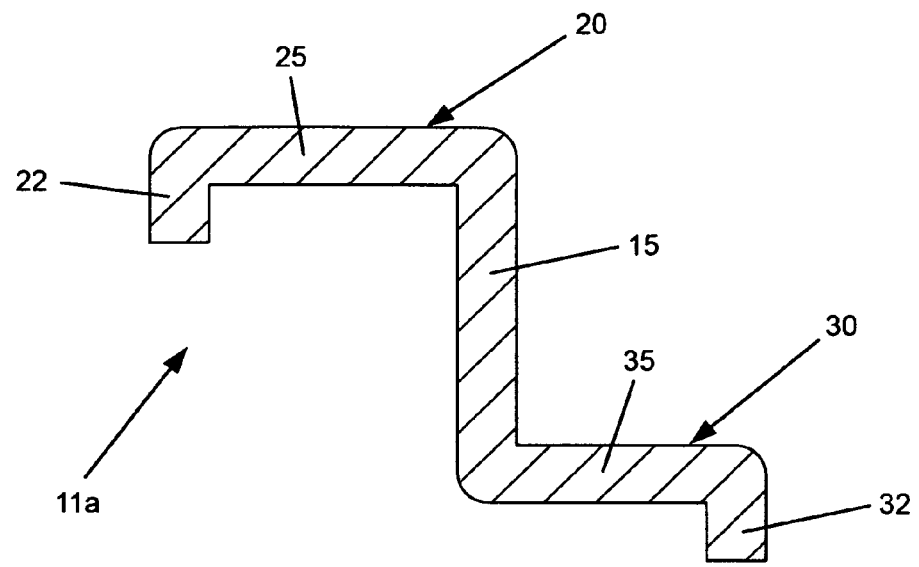
FIG. 3c is a cross-sectional view of an inventive cross-frame seal.

In some embodiments, a seal 11a, as shown in FIG. 3c, can be constructed similarly to the seal 10a of FIG. 3a having a middle portion 15, an upper end portion 22, an upper portion 25, a lower end portion 32, and a lower portion 35, but without the lower top portion 27 and the lower bottom portion 37. In this embodiment, the screen 5 can provide a greater portion of the force used in securing the seal 11a to the cross-frame than it provides to seal 10a.

Figure 3D:
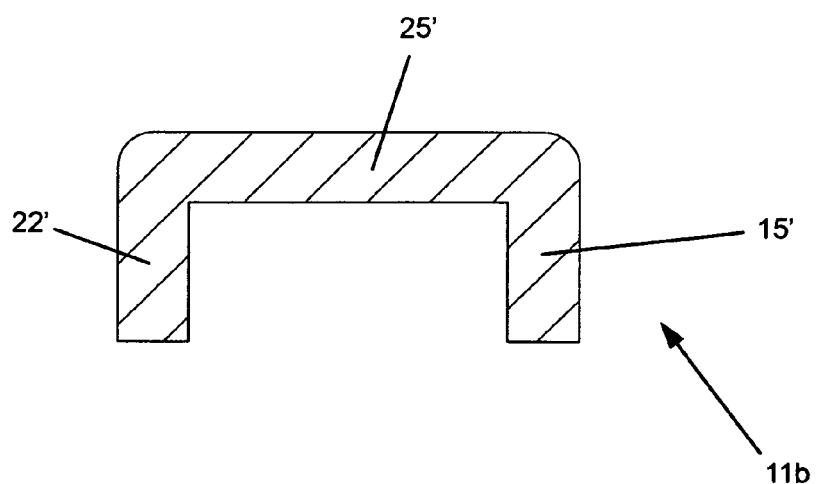
FIG. 3d is a cross-sectional view of an inventive discharge seal.

In some embodiments, a seal 11b, as shown in FIG. 3d, can be constructed similarly to the seal 10b of FIG. 3b having an end portion 22', an upper portion 25', and a down portion 15', but without the lower portion 27'. In this embodiment, the screen 5 can provide a greater portion of the force used in securing the seal 11b to the cross-frame than it provides to seal 10b.

Figure 5A:
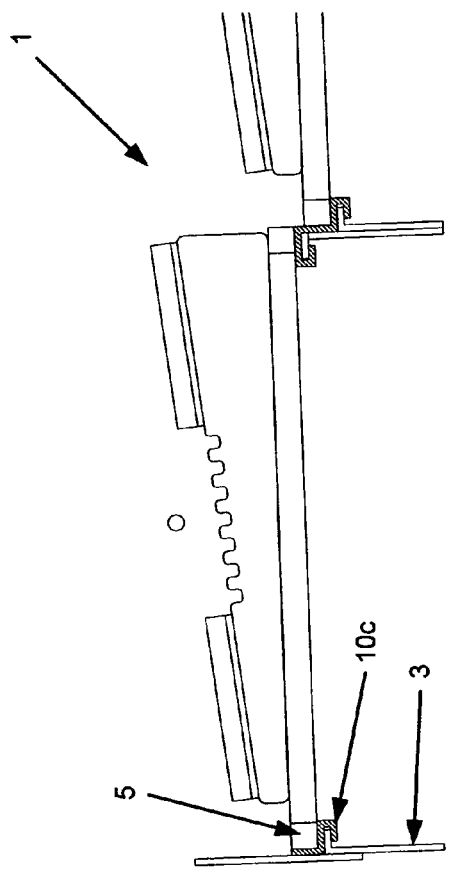
FIGS. 5a-5b are side views of a shaker and screen with cross-frame seal and feed seal.
Figure 5B:
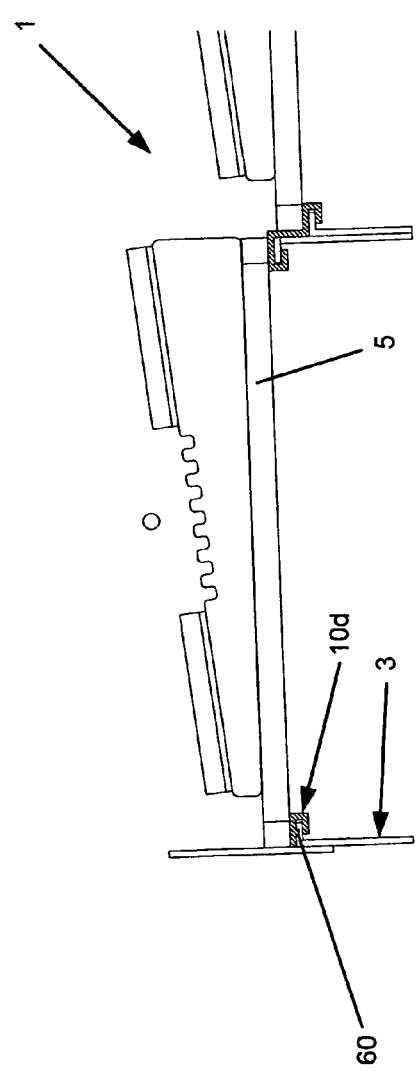

It should be noted that multiple middle cross frame seals 10a can be used depending on the number of screens used. In addition, as shown in FIGS. 5a and 5b, a feed cross frame seal 10c or 10d can be used.

The lipped feed cross frame seal 10c can have a similar shape as that of the lower end portion 32, the lower top portion 35, the lower bottom portion 37, and at least a portion of the middle portion 15 of middle cross frame seal 10a. The lipped feed seal 10c is shown in greater detail in FIG. 6a having an end portion 50, a lipped portion 45, an upper portion 46, and a lower portion 55 with a void space 58 defined at least in part by the end portion, the upper portion, and the lower portion.

Figure 6A:
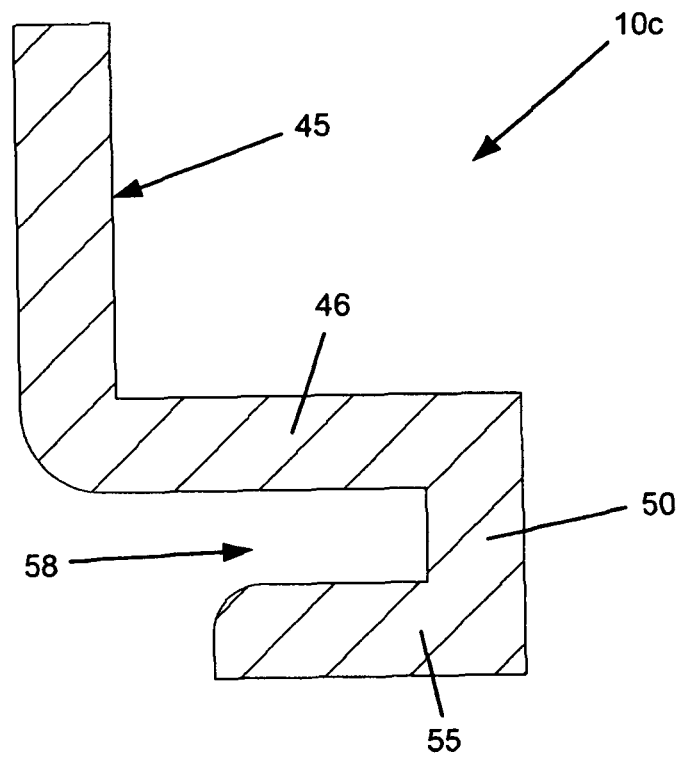
FIGS. 6a-6b are cross-sectional views of inventive seals.

As shown in FIG. 6a, the upper portion 46 and the lower portion 55 are substantially parallel with one another and substantially perpendicular to the lip portion 45 and the end portion 50. In some embodiments, one or more of the substantially parallel portions shown are not substantially parallel and/or one or more of the perpendicular portions shown are not substantially perpendicular.

Figure 7A:
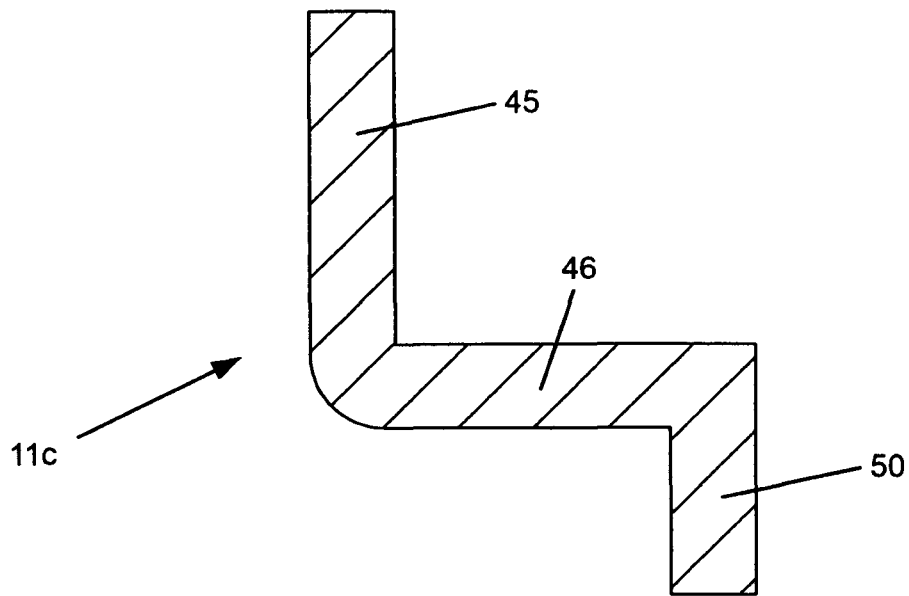
FIGS. 7a-7b are cross-sectional views of inventive seals.

In some embodiments, a seal 11c, as shown in FIG. 7a, can be constructed similarly to the seal 10c of FIG. 6a having an end portion 50, a lipped portion 45, and a seat portion 46, but without a lower portion 55. In this embodiment, the screen 5 can provide a greater portion of the force used in securing the seal 11c to the cross-frame than it provides to seal 10c.

In FIG. 5b, the nubbed feed cross frame seal 10d can have a similar shape as that of the lipped feed cross frame seal 10c except that the nubbed seal 10d has a nub 60 protruding from the upper portion 46' rather than a lip portion 45 extending from the upper portion 46 as does lipped seal 10c. The nubbed feed seal 10d is shown in greater detail in FIG. 6b having an end portion 50', a nub 60, an upper portion 46', and a lower portion 55' with a void space 58' defined at least in part by the end portion, the upper portion, and the lower portion. Looking again at FIG. 5b, in some embodiments the nub 60 extends into a hole in the support frame 3. The hole shown does not extend completely through the support frame, but in other embodiments it does. The hole may be round or elongated. In some embodiments the nub 60 can protrude into the hole and have an end larger than the hole.

Figure 6B:
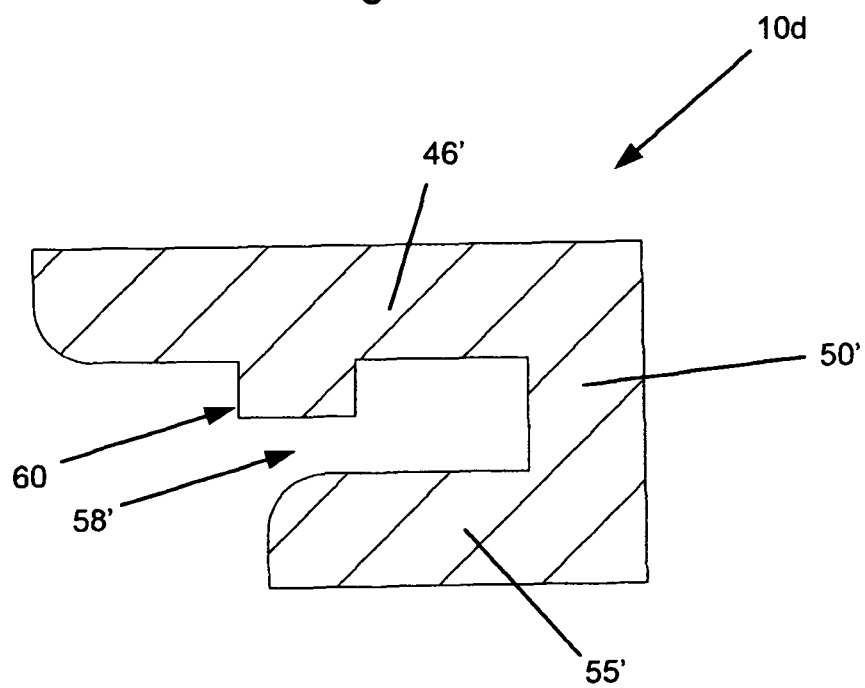
Figure 7B:
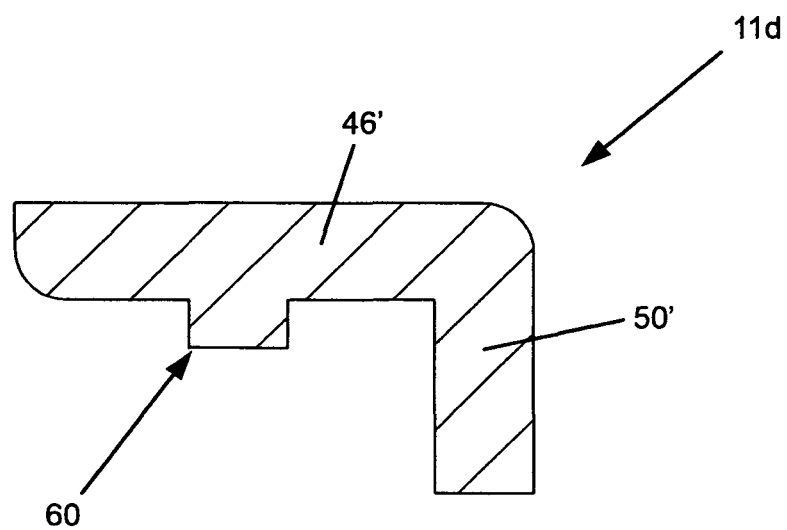

In some embodiments, a seal 11d, as shown in FIG. 7b, can be constructed similarly to the seal 10d of FIG. 6b having an end portion 50', a nubbed portion 60, and a seat portion 46', but without a lower portion 55'. In this embodiment, the screen 5 can provide a greater portion of the force used in securing the seal 11d to the cross-frame than it provides to seal 10d.

In some embodiments, the lipped seal 10c and/or the nubbed seal 10d can also be used as seals along the side of the screen 5. In at least one embodiment, the screen 5 is in contact with a lipped or nubbed feed cross frame seal 10c, 10d at the feed end of the screen 5, a discharge seal 10b at the discharge end of the screen 5, and additional lipped and/or nubbed seals 10c, 10d on the sides of the screen 5. It should be noted that lipped seal 11c and/or nubbed seal 11d illustrated in FIGS. 7a and 7b can also be used as seals along the side of the screen 5.

The nub 60 is constructed to fit within a space in the frame member 3 to secure the seal 10d and/or 11d to the frame member 3. The nub 60 can have a length such that it extends through the thickness of the frame member 3. In some embodiments the nub 60 may swell when it protrudes through the hole. The hole in different embodiments can be round and/or elongated. In some embodiments the hole/space within the frame member 3 is shallower than the thickness of the frame member 3; thus, as shown FIG. 5b, the nub 60 is shorter than the thickness of the frame member and only extends partially into the frame member 3.

As shown in FIG. 6b, the upper portion 46' and the lower portion 55' are substantially parallel with one another and substantially perpendicular to the nub 60 and the end portion 50. In some embodiments, one or more of the substantially parallel portions shown are not substantially parallel and/or one or more of the perpendicular portions shown are not substantially perpendicular.

The nub 60 can also be included in the design of the other seals (e.g. 10a-c). This can improve how securely the seal is attached to the frame 3.

Figure 8:
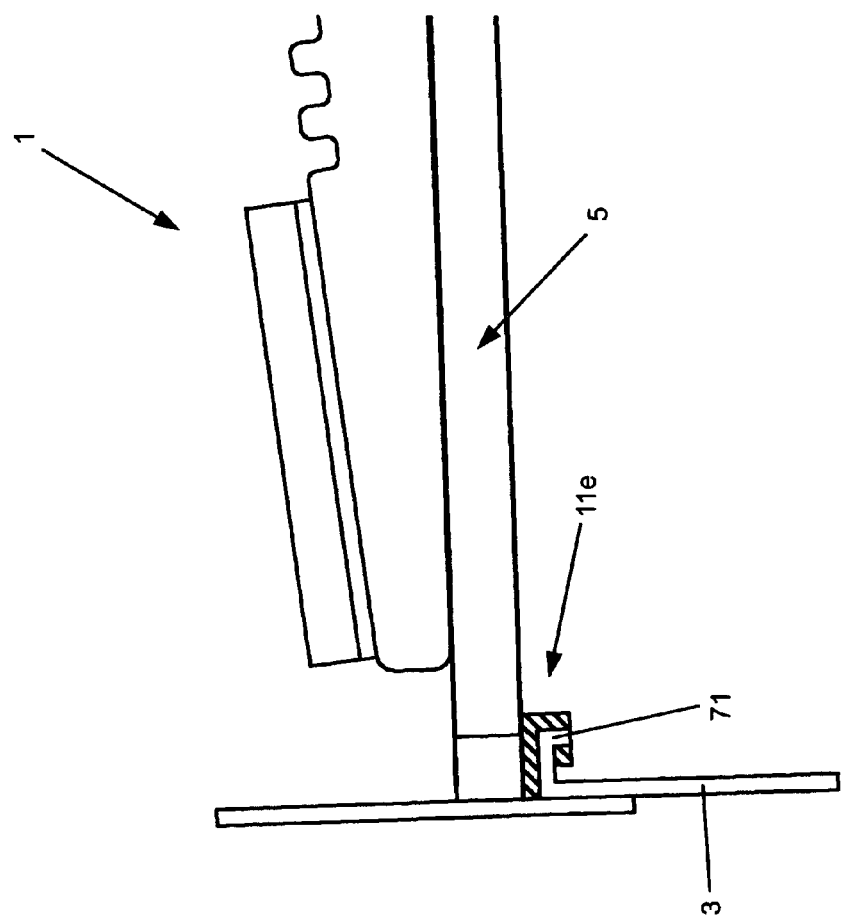
FIG. 8 is a side view of a shaker and screen with an inventive seal.
Figure 9A:
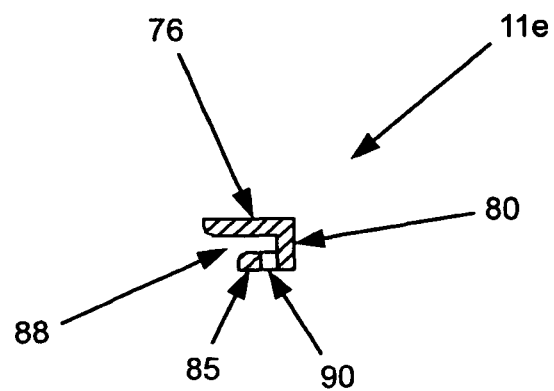
FIG. 9a is a cross-sectional view of an inventive seal
Figure 9B:
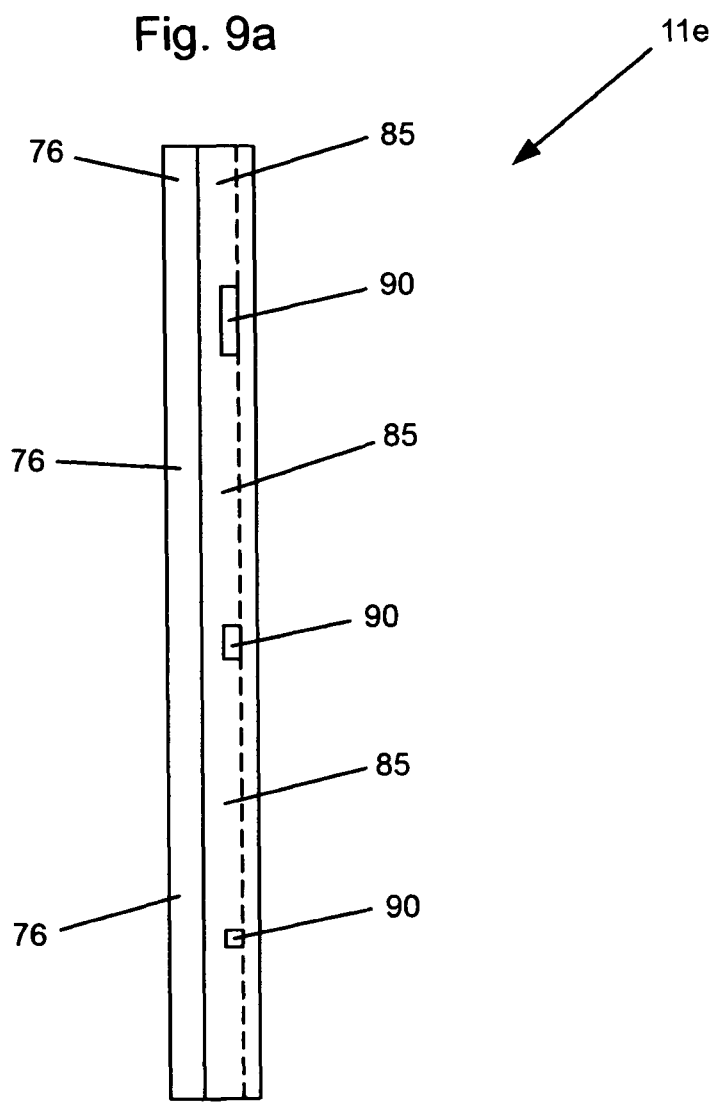

In FIG. 8 another embodied seal 11e is shown. In this embodiment, instead of the seal having a nub 60 as in FIG. 6b, the frame 3 itself has an extension 71 that is designed to extend into a void 90 of the seal 11e. In FIGS. 9a and 9b the embodied seal 11e of FIG. 8 is shown. In FIG. 9 the seal 11e includes a top portion 76 a side portion 80 and a bottom portion 85 with a void 90 there through. The frame 3 can have one or more extensions 71. The embodied seal 11e of FIG. 9b has multiple voids 90 into which extensions 71 of the frame 3 can extend. As shown in FIG. 9b, the voids 90 are of different sizes. In some embodiments the voids 90 are of the same size.

Figure 3E:
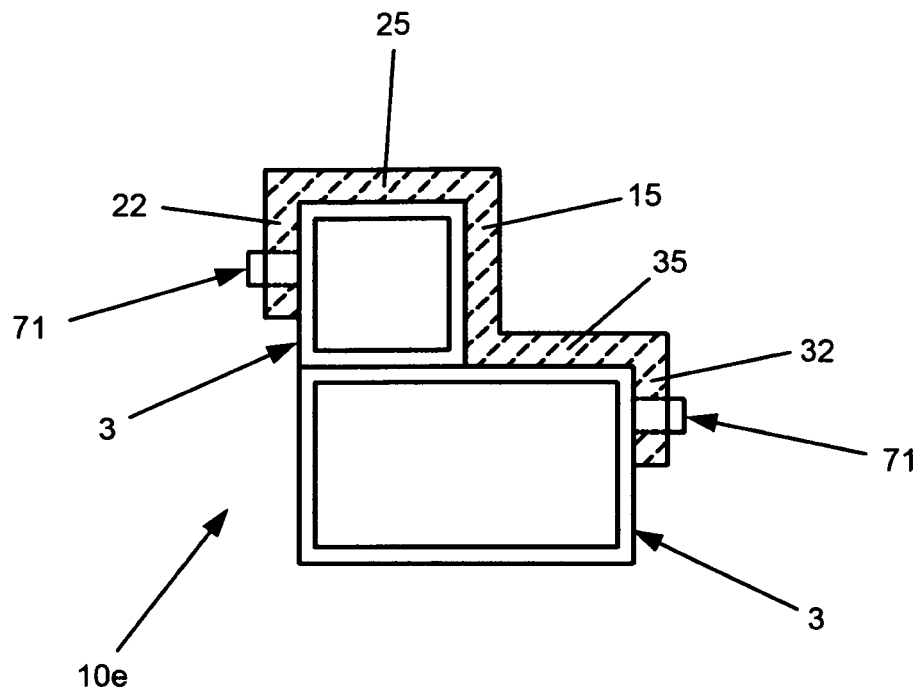
FIGS. 3e-3f are cross-sectional views of inventive seals.
Figure 3F:
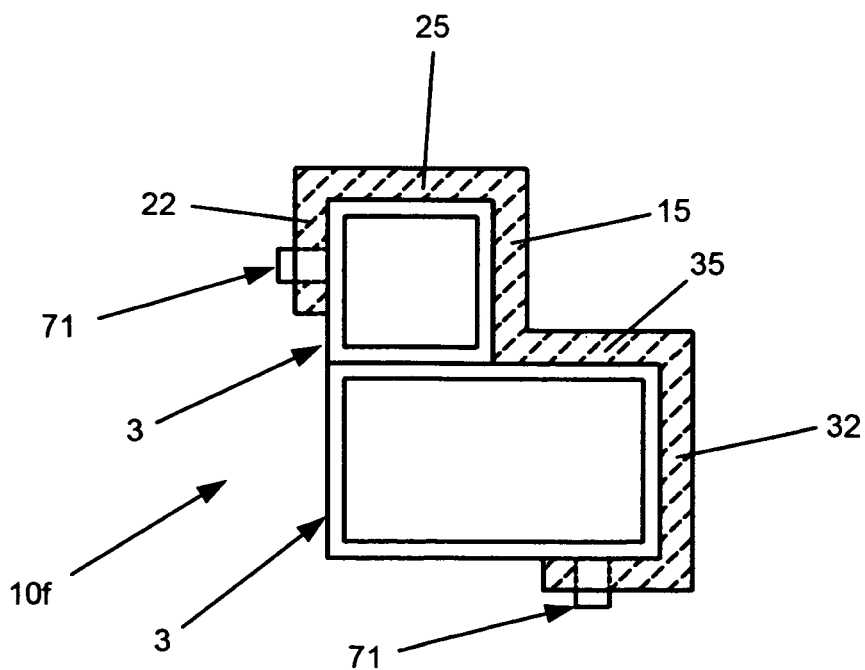

In some embodiments, seals 10e and 10f, as shown in FIGS. 3e and 3f, can be constructed having a middle portion 15, an upper end portion 22, an upper portion 25, a lower end portion 32, a lower portion 35, and at least one void or aperture 90 sized to receive at least one extension or nub 71 extending from the crossframe 3. As shown in FIGS. 3e and 3f, two extensions 71 are utilized. In some embodiments three or more extensions 71 are used. The crossframes 3 in FIGS. 3e and 3f are constructed of two tubes one above the other. In some embodiments a seal can wrap around the crossframe 3 and attach to an extension 71 at the bottom of a tube as shown in FIG. 3f. In some embodiments an extension 71 extends from the side of a tube and extends into the seal. It should be noted that the tubes can be of similar or substantially different sizes and/or offset from one another, thus allowing attachment to extensions 71 extending from the bottom of each tube.

In some embodiments one or more extensions 71 do not pass entirely through the seals 11*e*. In other embodiments the frame extensions 71 can extend from different portions of the frame 3 and in different directions. In at least some of these embodiments the seal has a void 90 within the seal such that the seal is better secured to the frame due to the extension(s) extending into the void(s).

All of the seals 10*a-d* and 11*a-d* can be held in place in large part by the form of the seal itself matching the form of the cross frame members as well as by the force exerted by the screen 5 itself resting on and/or against the seal. Additionally all of the seals 10*a-f* and 11*a-e* are shown having some sharp corners and some rounded corners. In some embodiments each seal can be constructed with the specific location of round corners and sharp corners as shown. In some embodiments the use of rounded or sharp corners are interchangeable. In some embodiments all the corners are rounded. In some embodiments all the corners are sharp.

A shaker 1 can utilize any or all of the cross frame seals 10*a-f* and 11*a-e* disclosed herein. In some embodiments multiple middle frame seals 10*a* are utilized. The crossframe seals 10*a-d* and 11*a-d* can also be fitted to shakers having a different shape of cross member 3. In light of the disclosure of this application, creating a seal that matches the form of the cross-frame of different shakers is within the bounds of the invention disclosed herein.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A shaker having a crossframe seal disposed about crossframes within the shaker, the crossframe seal having
    an upper lip having a configuration with an upper end portion, an upper top portion, and an upper bottom portion with a void space defined in part by the upper end portion, the upper top portion, and the upper bottom portion,
    a lower lip having a configuration with an upper end portion, a lower top portion, and an upper bottom portion with a void space defined in part by the lower end portion, the lower top portion, and the lower bottom portion,
    a middle portion connecting the upper lip and the lower lip.

2. The shaker of claim 1 further having a discharge seal, the discharge seal lockingly engaging about the framework of the discharge end.

3. The shaker of claim 1 further having a feed cross seal, the feed cross seal, lockingly engaging about the cross frame of the feed end.

4. The shaker of claim 3 wherein the cross frame of the feed end has frame holes that match nubs extending from the feed cross seal, the nubs fittingly engaging the frame holes.

5. The shaker of claim 1 wherein at least one of the crossframes includes at least one protruding portion, the seal having at least one aperture sized to fit around the at least one protruding portion.

6. The shaker of claim 5 having walls and wherein the at least one protruding portion is at least one nub having a width, the width being the longest dimension of the at least one nub, the at least one nub having a shape selected from the group consisting of circular, elliptical, elongated, regular polygonal, and irregular polygonal, each of the at least one nub having a width less than the length of distance between the walls of the shaker.

7. The shaker of claim 6 having multiple nubs along the crossframe, the nubs matched to extend into apertures within the seal.

* * * * *